(12) United States Patent
Lopes Pereira et al.

(10) Patent No.: US 12,523,121 B2
(45) Date of Patent: Jan. 13, 2026

(54) MODELING EFFICIENCY OF SOLIDS REMOVAL DURING WELLBORE FLUIDS DISPLACEMENTS

(71) Applicant: Halliburton Energy Services, Inc., Houston, TX (US)

(72) Inventors: Vitor Lopes Pereira, The Woodlands, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1531 days.

(21) Appl. No.: 16/616,607

(22) PCT Filed: Dec. 31, 2018

(86) PCT No.: PCT/US2018/068159
§ 371 (c)(1),
(2) Date: Nov. 25, 2019

(87) PCT Pub. No.: WO2020/142073
PCT Pub. Date: Jul. 9, 2020

(65) Prior Publication Data
US 2021/0115761 A1    Apr. 22, 2021

(51) Int. Cl.
*E21B 41/00* (2006.01)
*E21B 47/10* (2012.01)
(Continued)

(52) U.S. Cl.
CPC ............. *E21B 41/00* (2013.01); *E21B 47/10* (2013.01); *G01F 1/74* (2013.01); *G01F 1/76* (2013.01);
(Continued)

(58) Field of Classification Search
None
See application file for complete search history.

(56) References Cited

U.S. PATENT DOCUMENTS

| 4,833,915 A | 5/1989 | Radd et al. |
| 4,941,951 A | 7/1990 | Sheppard et al. |

(Continued)

FOREIGN PATENT DOCUMENTS

| CA | 2919059 A1 | 3/2015 | |
| FR | 2828708 A1 * | 2/2003 | ........... E21B 49/003 |

(Continued)

OTHER PUBLICATIONS

International Search Report issued in related PCT Application No. PCT/US2018/068159 mailed Sep. 27, 2019, 14 pages.

(Continued)

*Primary Examiner* — William D Hutton, Jr.
(74) *Attorney, Agent, or Firm* — Kilpatrick Townsend & Stockton LLP

(57) ABSTRACT

Determining the efficiency of solids removal from a wellbore during a wellbore displacement operation may prevent the unnecessary consumption of resources at a well site and enhance the performance of subsequent wellbore operations. The efficiency of solids removal may be based, at least in part, on one or more expected masses of one or more return fluids returned to the surface from a wellbore displacement operation, wherein the determining the expected masses comprises using one or more properties of one or more wellbore servicing fluids before the wellbore servicing fluids are used in the wellbore displacement operation. The expected masses may be compared to actual masses of wellbore fluids returned to the surface, wherein the actual masses are determined from samples of the wellbore fluids obtained from a return line of the wellbore. To improve operational decision making at a well site, operators or automated processes may modify the wellbore displacement operation based, at least in part, on the comparison between the expected masses and the actual masses.

19 Claims, 8 Drawing Sheets

(51) Int. Cl.
  *G01F 1/74* (2006.01)
  *G01F 1/76* (2006.01)
  *G05B 13/04* (2006.01)
  *G06F 30/28* (2020.01)
  *E21B 21/08* (2006.01)
  *G01N 33/28* (2006.01)
  *G06F 111/10* (2020.01)

(52) U.S. Cl.
  CPC .............. *G05B 13/04* (2013.01); *G06F 30/28* (2020.01); *E21B 21/08* (2013.01); *E21B 2200/20* (2020.05); *G01N 33/2823* (2013.01); *G06F 2111/10* (2020.01)

(56) References Cited

U.S. PATENT DOCUMENTS

| | | | |
|---|---|---|---|
| 6,176,323 | B1 | 1/2001 | Weirich et al. |
| 6,308,787 | B1 * | 10/2001 | Alft ........................ E21B 44/00 175/48 |
| 9,416,631 | B2 | 8/2016 | Wu et al. |
| 2015/0066457 | A1 | 3/2015 | Wu et al. |
| 2018/0320464 | A1 | 11/2018 | Heitmann |

FOREIGN PATENT DOCUMENTS

| | | |
|---|---|---|
| GB | 2335687 A | 9/1999 |
| GB | 2524788 A | 10/2015 |
| RU | 2386783 C2 | 4/2010 |
| WO | 00/73620 A1 | 12/2000 |
| WO | 2015/030863 A1 | 3/2015 |

OTHER PUBLICATIONS

Ekambara, Kalekudithi, and J. B. Joshi. "Axial mixing in pipe flows: turbulent and transition regions." Chemical Engineering Science 58.12 (2003): 2715-2724.
Gibson Applied Technology and Engineering, Inc., "Axial Mixing in Pipe Displacement", Jul. 2012, 2 pages.
Sutherland, B. R., et al. "Interfacial Mixing in Viscous Pipe Flows Final report to Imperial Oil." (2000).
Enayatpour, Saeid, and Eric van Oort. "Advanced modeling of cement displacement complexities." SPE/IADC Drilling Conference and Exhibition. Society of Petroleum Engineers, 2017.
Jakobsen, J., et al. "Displacements in eccentric annuli during primary cementing in deviated wells." SPE Production Operations Symposium. Society of Petroleum Engineers, 1991.
Beirute, R. M., F. L. Sabins, and K. V. Ravi. "Large-scale experiments show proper hole conditioning: A critical requirement for successful cementing operations." SPE Annual Technical Conference and Exhibition. Society of Petroleum Engineers, 1991.
Smith, T. R., and K. M. Ravi. "Investigation of drilling fluid properties to maximize cement displacement efficiency." SPE Annual Technical Conference and Exhibition. Society of Petroleum Engineers, 1991.
Ravi, K. M., R. M. Beirute, and R. L. Covington. "Erodability of partially dehydrated gelled drilling fluid and filter cake." SPE Annual Technical Conference and Exhibition. Society of Petroleum Engineers, 1992.
Vefring, E. H., et al. "Optimization of displacement efficiency during primary cementing." Latin American and Caribbean Petroleum Engineering Conference. Society of Petroleum Engineers, 1997.
Biezen, Ewout, Niels van der Werff, and Kris Ravi. "Experimental and numerical study of drilling fluid removal from a horizontal wellbore." SPE annual technical conference and exhibition. Society of Petroleum Engineers, 2000.
Hemphill, T., and K. Ravi. "Pipe Rotation and Hole Cleaning in an Eccentric Annulus." IADC/SPE Drilling Conference. 2006.
Gorokhova, Lidia, Andrew J. Parry, and Nicolas C. Flamant. "Comparing soft-string and stiff-string methods used to compute casing centralization." SPE Drilling & Completion 29.01 (2014): 106-114.
Karbasforoushan, Hanieh, et al. "On the Instability of Cement-Fluid Interface and Fluid Mixing." SPE Deepwater Drilling and Completions Conference. Society of Petroleum Engineers, 2016.
Leach, S.J. "Stratification and Mixing of Fluids of Different Densities," 1968, 9 pages.
Alba, K., S. M. Taghavi, and I. A. Frigaard. "Miscible density-stable displacement flows in inclined tube." Physics of Fluids 24.12 (2012): 123102.
Liao, Jue. "Rayleigh-Taylor growth rate for arbitrary density profiles calculated with a variational method." Laboratory for Laser Energetics Summer High School Project Report (2002).
International Preliminary Report on Patentability issued in related PCT Application No. PCT/US2018/068159 mailed Jul. 15, 10 pages.

* cited by examiner

MODELING EFFICIENCY OF SOLIDS REMOVAL DURING WELLBORE FLUIDS DISPLACEMENTS

CROSS-REFERENCE TO RELATED APPLICATION

The present application is a U.S. National Stage Application of International Application No. PCT/US2018/068159 filed Dec. 31, 2018, which is incorporated herein by reference in its entirety for all purposes.

TECHNICAL FIELD

The present invention relates to methods for modeling the removal of residual oils and solids in a wellbore, and, more particularly, to systems and methods for characterizing the efficiency of solids removal from the wellbore during a wellbore fluids displacement.

BACKGROUND

In a well system environment, residual oil and solids left in a wellbore by drilling and completion operations may detrimentally affect the performance of subsequent operations. A wellbore fluids displacement is an operation used to remove solids and debris and displace existing fluids in the wellbore by circulating a wellbore servicing fluid through the wellbore. Wellbore fluids displacements remove unwanted fluid deposits through both mechanical and chemical means of cleaning. For instance, depending on the selection of wellbore servicing fluid, residual deposits may be solubilized, dissolved, or mechanically eroded from the wellbore walls. Failure to perform an effective wellbore fluids displacement may create unnecessary burdens for logistics and rig resources, for example, by hindering completion operations and damaging the wellbore.

One key objective of wellbore fluids displacement is the effective removal of solids from the wellbore. However, determining the efficiency of solids removal from the wellbore presents numerous challenges. For instance, even though physical samples of wellbore servicing fluids may be extracted and analyzed to determine a quantity of solids removed, such an analysis provides little to no information about the quantity of solids remaining in the wellbore. Moreover, determining the amount of solids in an extracted fluid sample is often time-consuming and operationally impractical for displacement operations.

Modeling removal of solids from the wellbore also presents challenges. Accurate modeling of a well system environment requires attention to numerous parameters, such as non-Newtonian flow, wellbore geometry (pipe eccentricity, diameters, hole trajectory), thermal gradients, wellbore lithology and stress state, downhole fluid properties (such as density and rheology), downhole properties of fluid deposits, pump rates, fluids sequence and pipe rotation effects. As a result, existing computational methods are often unwieldy, take longer than operationally practical, or are based on data mining that most often requires extrapolation over existing data boundaries. Therefore, new methods and tools are needed to provide accurate and timely predictions for the efficiency of solids removal.

Figure 1:
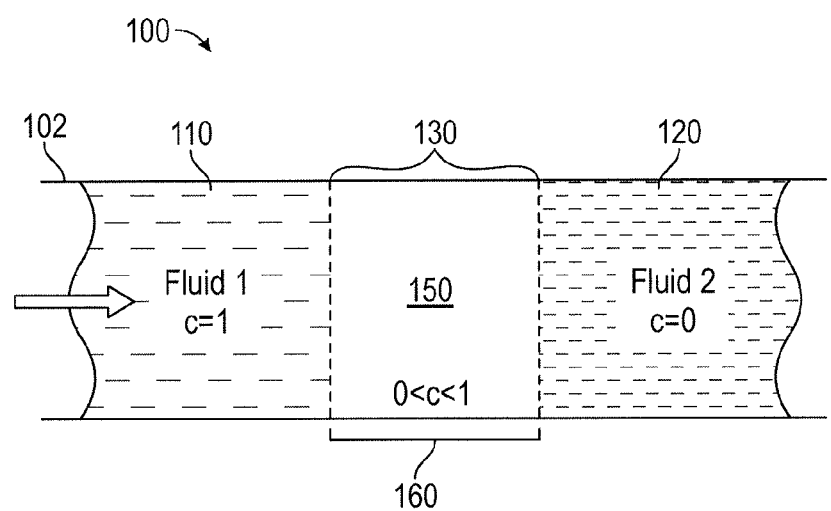
FIG. 1 is a diagram illustrating a mixing zone, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present invention relates generally to operations performed and equipment utilized in conjunction with a subterranean wellbore and, in one or more embodiments described herein, more particularly provides a method and system for modeling the efficiency of solids removal from the wellbore during a wellbore fluids displacement.

Residual unwanted substances from wellbore operations may create operational challenges, such as damage to the wellbore. Wellbore fluids displacement is defined as an operation used to clean a wellbore of residual substances and displace one or more drilling fluids. A wellbore fluids displacement operation is hereafter referred to as a "displacement operation." A displacement operation is considered successful if the one or more initial fluids and one or more solids are no longer present or detectable in the wellbore (or desired portions of the wellbore) at the end of the displacement operation. Proper removal of one or more residual oils, one or more solids or both is vital to the longevity of a wellbore because residue may hinder completion operations and damage a producing subterranean formation. A displacement operation is performed using a series of one or more wellbore servicing fluids, namely "pills," "spacers," or both, which provide both chemical and mechanical cleaning. For example, during a displacement operation, one or more pills, one or more spacers, or both with one or more individual cleaning functions are circulated through the wellbore in a sequence known as a displacement train.

A displacement operation is constrained by various factors, including, but not limited to, environmental regulations, operational restrictions, and the risk of wellbore damage. Therefore, planning, designing, and executing a displacement operation requires rigorous adherence to detailed steps and best practices in order to achieve thorough cleaning efficiency. Design selection and operation modeling for displacement operations require detailed consideration of data of fluids involved in the displacement process. One or more suitable cleaning additives, as well as one or more properties associated with the one or more suitable cleaning additives, one or more concentrations, one or more volumes, one or more flow rates and one or more pipe rotations (which are used to generate a sufficient fluid shear stress on the wellbore) are determined by one or more factors. The one or more factors may comprise one or more initial fluid types, one or more final fluid types, one or more initial fluid properties, one or more final fluid properties, one or more fluid losses to formation, a downhole pressure, a downhole temperature, a differential pressure into the formation, one or more shutdown periods, a drilling history, a wellbore geometry, one or more rig capabilities, one or more downhole properties of one or more fluid deposits, and any combination thereof.

Poor design of a displacement operation may create unnecessary burdens for logistics and rig resources. For example, additional displacement operations may be required to rectify a poorly executed displacement operation. During the planning phase of a displacement operation, a volume, one or more properties, a chemistry, a concentration, and a flow regime of one or more fluids are carefully designed to consider the individual role of each pill, spacer or both in the displacement operation. Any one or more of a mechanical component, a chemical component, and a hydraulic component play a vital role in the displacement operation. An optimal design maximizes the cleaning efficiency of a displacement operation, which requires attention to mechanical removal of cuttings, as well as both the chemical and mechanical removal of one or more gelled fluids, one or more filter cakes, and any combination thereof. Designers may also modify a volume, one or more properties, a chemistry, a concentration, a flow regime, and combination thereof of a fluid to accommodate the individual purpose of each pill, each spacer, or both.

Several factors must be considered during the selection of suitable cleaning additives for displacement operations, such as an initial fluid type, a final fluid type, one or more initial fluid properties, one or more final fluid properties, an amount of fluid loss to formation, a downhole pressure, a downhole temperature, a differential pressure into the formation, a shutdown period, a drilling history, a wellbore geometry, one or more rig capabilities, one or more filter cake properties, other parameters for the wellbore system, or a combination of these. Accordingly, measuring and tracking data related to fluids in a displacement operation is essential for design selection and operation modeling of one or more operations associated with the wellbore, for example, one or more hydrocarbon exploration, production, recovery and completion operations.

The following disclosure addresses the challenge of determining the efficiency of solids removal during a displacement operation. To facilitate a better understanding of the present invention, the following examples of certain embodiments are given. In no way should the following examples be read to limit, or define, the scope of the invention. One or more embodiments of the present disclosure may be applicable to any type of drilling operation including, but not limited to, exploration, services or production operation for any type of well site or reservoir environment including subsurface and subsea environments.

According to one or more aspects of the present disclosure, an information handling system or computer equipment may be required. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For example, referring now to FIG. 1, illustrated is a schematic diagram 100 of miscible fluid displacement in a fluid channel 102, according to one or more aspects of the present invention. FIG. 1 depicts a first fluid 110 displacing a second fluid 120 in a fluid channel 102. In one or more embodiments, the first fluid 110 may comprise any one or more fluids and the second fluid 120 may comprise any one or more other fluids. In one or more embodiments, any one or more first fluids 110 may be the same as or similar to any one or more second fluids 120. In FIG. 1, the first fluid 110 and the second fluid 120 may be miscible fluids with one or more distinct physical properties. For example, the first fluid 110 may comprise or may be described or distinguished by a viscosity $\mu_1$ and a density $\rho_1$ and second fluid 120 may comprise or may be described or distinguished by a viscosity $\mu_2$ and a density $\rho_2$, where $\mu_1 \neq \mu_2$ or $\rho_1 \neq \rho_2$. The region between the first fluid 110 and the second fluid 120, where the first fluid 110 and the second fluid 120 interact and mix, may be described as a mixing and channeling zone 130. The mixing and channeling zone 130 is the region where at least a portion of both the first fluid 110 and the second fluid 120 is present. The composite fluid 150 present in the mixing and channeling zone 130 may be a composition of at least a portion of both the first fluid 110 and second fluid 120. In one or more embodiments, interface length 160 is a length of the mixing and channeling zone 130. At any one or more time intervals, mixing and channeling zone 130 comprises a volume of composite fluid 150 referred to as an interface volume. In a displacement operation, mixing between the first fluid 110 and the second fluid 120 may be undesirable, for instance, because the composite fluid 150 may have diminished cleaning capabilities.

Figure 2:
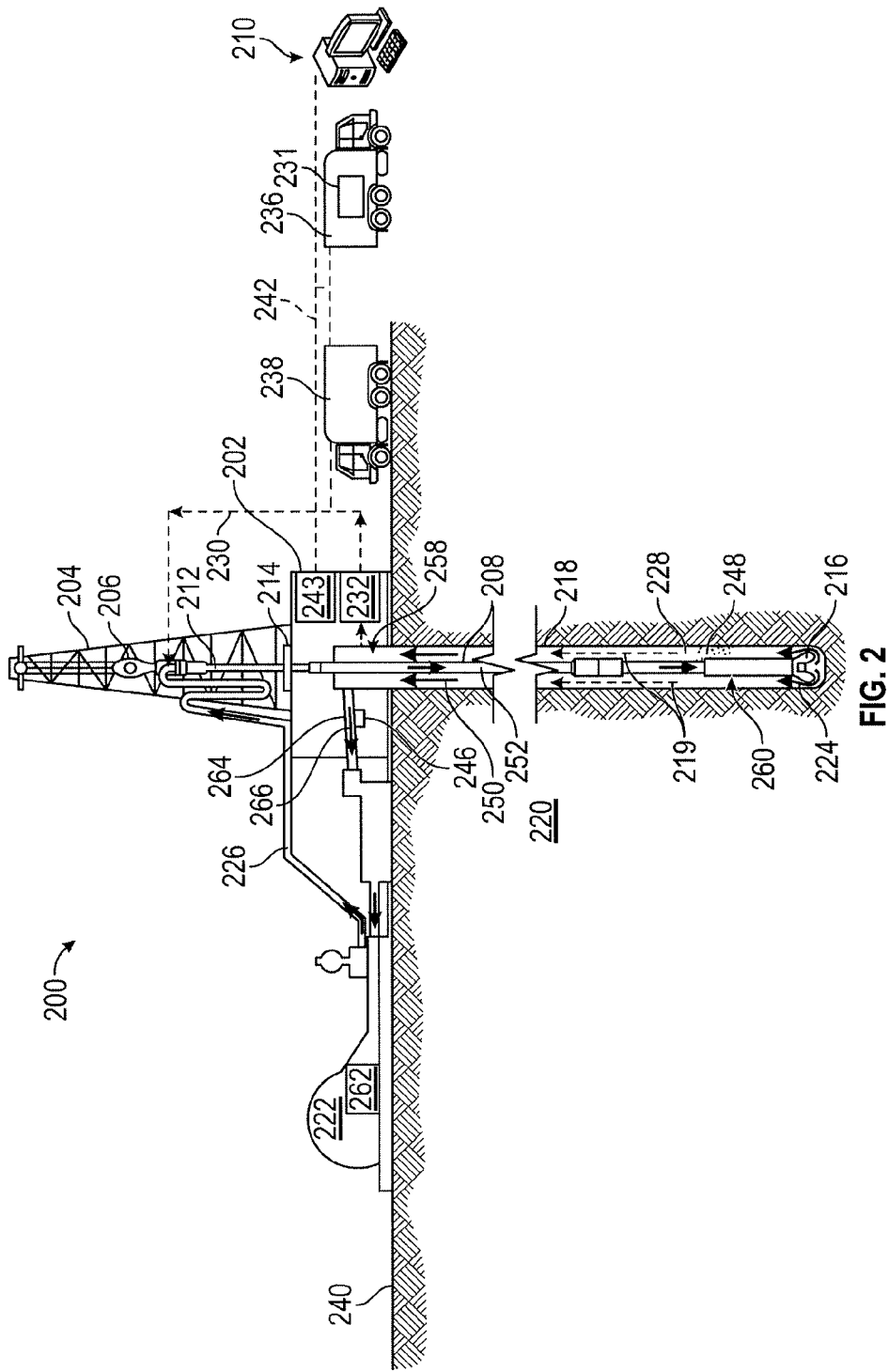
FIG. 2 is a schematic diagram of a wellbore servicing system, according to one or more aspects of the present disclosure.

FIG. 2 illustrates a wellbore servicing system 200 and wellbore monitoring system 210 that may employ one or more of methods described herein in order to predict downhole fluid contamination or identify one or more fluids, according to one or more embodiments. The example wellbore servicing system 200 comprises a drilling platform 202 that supports a derrick 204 having a traveling block 206 for raising and lowering a drill string 208. A kelly 212 supports the drill string 208 as it is lowered through a rotary table 214. A drill bit 216 is attached to the distal end of the drill string 208 and is driven either by a downhole motor and/or via rotation of the drill string 208 from the well surface. As the bit 216 rotates, it creates a wellbore 218 that penetrates various subterranean formations 220. The example wellbore 218 shown in FIG. 2 comprises a vertical wellbore. However, a wellbore servicing system 200 may comprise any combination of horizontal, vertical, slant, curved, or other wellbore orientations.

A pump 222 (for example, a mud pump) circulates wellbore servicing fluid 224 through a feed pipe 226 and to the kelly 212, which conveys the wellbore servicing fluid 224 downhole through an interior conduit 252 defined in the drill string 208 and through one or more orifices in the drill bit 216. The wellbore servicing fluid 224 is then circulated back to the surface via an annulus 228 defined between the drill string 208 and the walls of the wellbore 218. The route through which wellbore servicing fluid 224 circulates may be described using one or more fluid flow paths 219. In one or more embodiments, operation of wellbore servicing system 200 may comprise diverting wellbore servicing fluid 224 to fluid reclamation equipment 232 and optimizing associated fluid reclamation equipment 232.

The wellbore servicing fluid 224 may carry out several functions, such as the mechanical and chemical removal of one or more fluid deposits from wellbore walls, and the mechanical removal of cuttings and solids. The wellbore servicing fluid 224 may be any wellbore clean-up or completion fluid known to those skilled in the art. In one or more embodiments, for example, the wellbore servicing fluid 224 may be water, such as a brine or the like, or one or more spacer fluids known to those skilled in the art. The wellbore servicing fluid 224 may be, but is not limited to, municipal treated or fresh water, sea water, salt water (for example, water containing one or more salts dissolved therein) naturally-occurring brine, a chloride-based, bromide-based, or formate-based brine containing monovalent and/or polyvalent cations, aqueous solutions, non-aqueous solutions, base oils, and any combination thereof. Examples of chloride-based brines comprise sodium chloride and calcium chloride. Examples of bromide-based brines comprise sodium bromide, calcium bromide, and zinc bromide. Examples of formate-based brines comprise sodium formate, potassium formate, and cesium formate. To those of ordinary skill in the art, one or more types of wellbore servicing fluid 224 may be referred to as a "pill" or a "spacer."

Wellbore servicing fluid 224 may be conveyed or otherwise introduced into the wellbore 218 at predetermined intervals of time in order to, among other things, clean up the wellbore 218 and displace one or more existing fluids 250 from the wellbore 218. For example, in a displacement operation, the wellbore servicing fluid 224 may be circulated through the wellbore 218 along one or more fluid flow paths 219 in order to flush the existing fluids 250 and residual substances 248 out of the wellbore 218. For instance, the wellbore servicing fluid 224 may be circulated through the wellbore 218 at the end of a drilling operation in order to perform a displacement operation of the wellbore 218 in preparation for hydrocarbon production. The displacement of existing fluids 250 by wellbore servicing fluid 224 may comprise miscible fluid displacement, as shown in FIG. 1. Miscible fluid displacement results in a composite fluid 150 comprising wellbore servicing fluid 224 and existing fluid 250. In one or more embodiments, existing fluids 250 may comprise one or more wellbore servicing fluids 224 that remain in the wellbore 218 due to an incomplete or partial circulation of wellbore servicing fluids 224.

In one or more embodiments, upon returning to the surface and exiting the wellbore 218, the wellbore servicing fluid 224 may be conveyed to one or more servicing fluid reclamation equipment 232 fluidly coupled to the annulus 228. The reclamation equipment 232 may be configured to receive and rehabilitate the wellbore servicing fluid 224 in preparation for its reintroduction into the wellbore 218, if desired. The reclamation equipment 232 may comprise one or more filters or separation devices configured to clean the wellbore servicing fluid 224. In at least one embodiment, the reclamation equipment 232 may comprise a diatomaceous earth filter, or the like.

In one or more embodiments, wellbore servicing system 200 comprises one or more instrument trucks 236, one or more pump trucks 238, and a wellbore servicing fluid control subsystem 231. The wellbore servicing system 200 may perform one or more displacement operations that comprise, for example, a multi-stage displacement operation, a single-stage displacement operation, a final displacement operation, other types of displacement operations, or a combination of these. For example, a displacement operation may circulate one or more wellbore servicing fluids 224 (for example, one or more pills, one or more spacers, and any combination thereof) over a single time period or a plurality of time periods. The circulation of a plurality of wellbore servicing fluids 224 in sequential order forms a "displacement train." Moreover, the wellbore servicing system 200 can circulate fluid through any suitable type of wellbore, such as, for example, vertical wellbores, slant wellbores, horizontal wellbores, curved wellbores, or combinations of these and others.

The one or more pump trucks 238 may comprise any one or more of one or more mobile vehicles, one or more immobile installations, one or more skids, one or more hoses, one or more tubes, one or more fluid tanks, one or more fluid reservoirs, one or more pumps, one or more valves, one or more mixers, or any other one or more types of structures and equipment. The one or more pump trucks 238 shown in FIG. 2 can supply wellbore servicing fluid 224 or other materials for the displacement operation. The one or more pump trucks 238 may convey the wellbore servicing fluid 224 downhole through the interior conduit 252 defined in the drill string 208 and through one or more orifices in the drill bit 216.

The one or more instrument trucks 236 may comprise mobile vehicles, immobile installations, or other structures. The one or more instrument trucks 236 shown in FIG. 2 comprise a wellbore servicing fluid control subsystem 231 that controls or monitors the displacement operation applied by the wellbore servicing system 200. One or more communication links 242 may communicatively couple the one or more instrument trucks 236 to the one or more pump trucks 238, or other equipment at a ground surface 240. In one or more embodiments, the one or more communication links 242 may communicatively couple the one or more instrument trucks 236 to one or more controllers 243 disposed at or about the wellbore, one or more sensors (such as surface sensors 258 and downhole sensors 260), other one or more data collection apparatus in the wellbore servicing system 200, remote systems, other well systems, any equipment installed in the wellbore 218, other devices and equipment, or a combination thereof. In one or more embodiments, the one or more communication links communicatively couple the one or more instrument trucks 236 to the wellbore monitoring system 210, which may run one or more simulations and record simulation data. The wellbore servicing system 200 may comprise a plurality of uncoupled communication links 242 or a network of coupled communication links 242. The communication links 242 may comprise direct or indirect, wired or wireless communications systems, or combinations thereof.

The wellbore servicing system 200 may also comprise one or more surface sensors 258 and one or more downhole sensors 260 to measure a pressure, a rate, a temperature, and any other parameters of displacement operations. For example, the surface sensors 258 and downhole sensors 260 may comprise meters or other equipment that measure properties of one or more fluids in the wellbore 218 at or near the ground surface 240 level or at other locations. The wellbore servicing system 200 may comprise one or more pump controls 262 or other types of controls for starting, stopping, increasing, decreasing or otherwise controlling pumping as well as controls for selecting or otherwise controlling fluids pumped during the displacement operation. The wellbore servicing fluid control subsystem 231 may communicate with the one or more of one or more surface sensors 258, one or more downhole sensors 260, one or more pump controls 262, and other equipment to monitor and control the displacement operation.

In one or more embodiments, the wellbore servicing system 100 may comprise one or more sampling systems 246 arranged, disposed or positioned along or in a fluid flow path 219 in order to monitor wellbore servicing fluid 224 contained therein. The one or more sampling systems 246 collect one or more samples of one or more different pumped fluids (such as wellbore servicing fluids 224 and one or more existing fluids 250) as the one or more different pumped fluids return to the surface 240 and capture information associated with the one or more samples, such as a pump stroke and a time at which a sample was conducted. One or more fluid properties may be measured for the different samples, enabling an analysis of the quality of the displacement operation. The one or more fluid properties measured may comprise any one or more of density, viscosity, water content, oil content, solids content, salt content, capacitance, thermal and electrical conductivity, electrical stability (ES), and acidity (pH). In one or more embodiments, the one or more sampling systems 246 may be optical computing devices specifically configured for detecting, analyzing, and quantitatively measuring a particular characteristic of the pumped fluid or a component present within the pumped fluid. In one or more embodiments, the optical computing devices may be general purpose optical devices, with post-acquisition processing (for example, through computer means) being used to specifically detect the characteristic of the sample. The optical computing devices can perform calculations (analyses) in real time or near real time without the need for time-consuming sample processing.

In one or more embodiments, the sampling systems 246 may be used to conduct a "flow back analysis," as is known to those of ordinary skill in the art. In a flow back analysis, one or more samples of a return fluid 266 are collected at one or more return lines 264 in order to assess one or more physical properties and one or more chemical properties of the return samples. Due to mixing in the wellbore during a displacement operation, the return fluid 266 may be or comprise a portion of wellbore servicing fluid 224, a portion of existing fluids 250, a portion of residual substances 248, and any combination thereof.

The wellbore monitoring system 210 may comprise one or more information handling systems (such as the information handling system represented in FIG. 3) located at the wellbore 218 or any one or more other locations. The wellbore monitoring system 210 or any one or more components of the wellbore monitoring system 210 may be located remote from any one or more of the other components shown in FIG. 2. For example, the wellbore monitoring system 210 may be located at a data processing center, a computing facility, or another suitable location. The wellbore servicing system 200 may comprise additional or different features, and the features of the wellbore servicing system 200 may be arranged as shown in FIG. 2 or in another configuration.

In one or more embodiments, the wellbore servicing fluid control subsystem 231 shown in FIG. 2 controls operation of the wellbore servicing system 200. The wellbore servicing fluid control subsystem 231 may comprise one or more data processing equipment, one or more communication equipment, or other systems that control the circulation of wellbore servicing fluids through the wellbore 218. The wellbore servicing fluid control subsystem 231 may be communicatively linked or communicatively coupled to the wellbore monitoring system 210, which may calculate, select, or optimize displacement operation parameters. The wellbore servicing fluid control subsystem 231 may receive, generate or modify a displacement operation plan (for example, a pumping schedule or displacement train) that specifies parameters of a displacement operation to be applied to the wellbore 218.

In one or more embodiments, the wellbore monitoring system 210 may simulate wellbore hydraulics in the wellbore servicing system 200. For example, the wellbore monitoring system 210 may comprise one or more flow models for simulating fluid flow in or between various locations of fluid flow in the well system, such as, for example, the wellbore 218, the drill string 208, any other components, and any combination thereof. The one or more flow models may also model the flow of miscible fluids, immiscible fluids, or composite fluids comprised of a plurality of fluids. In one or more embodiments, the one or more flow models may model flow in one, two, or three spatial dimensions. The one or more flow models may comprise nonlinear systems of differential or partial differential equations. The wellbore monitoring system 210 may generate a plurality of nodes or a mesh for use in the one or more flow models or one or more simulations. The wellbore monitoring system 210 can use the flow models to predict, describe, or otherwise analyze the dynamic behavior of fluid in the wellbore servicing system 200.

The wellbore monitoring system 210 may perform one or more simulations before, during, or after the displacement operation. In one or more embodiments, the wellbore servicing fluid control subsystem 231 controls the displacement operation based on one or more simulations performed by the wellbore monitoring system 210. For example, a pumping schedule or one or more other aspects of the displacement operation may be generated in advance based on one or more simulations performed by the wellbore monitoring system 210. As another example, the wellbore servicing fluid control subsystem 231 may modify, update, or generate a displacement operation based on one or more simulations performed by the wellbore monitoring system 210 in real time during the displacement operation.

In one or more embodiments, the one or more simulations are based on data obtained from the wellbore servicing system 200. For example, one or more pressure meters, one or more flow monitors, one or more microseismic equipment, one or more tiltmeters, or other equipment can perform measurements before, during, or after a displacement operation; and the wellbore monitoring system 210 may simulate wellbore hydraulics based on the measured data. In one or more embodiments, the wellbore servicing fluid control subsystem 231 may select or modify (for example, increase or decrease) one or more pressures of the wellbore servicing fluid 224, one or more densities of the wellbore servicing fluid 224, one or more viscosities of the wellbore servicing fluid 224, one or more compositions of the wellbore servicing fluid 224, and one or more other control parameters based on data provided by the one or more simulations. In one or more embodiments, data provided by the one or more simulations may be displayed in real time during the displacement operation, for example, to an engineer or other operator of the wellbore servicing system 200.

In one or more embodiments, the techniques and operations described herein may be implemented by one or more information handling systems configured to provide the functionality described. In various instances, a computing system may comprise any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 3:
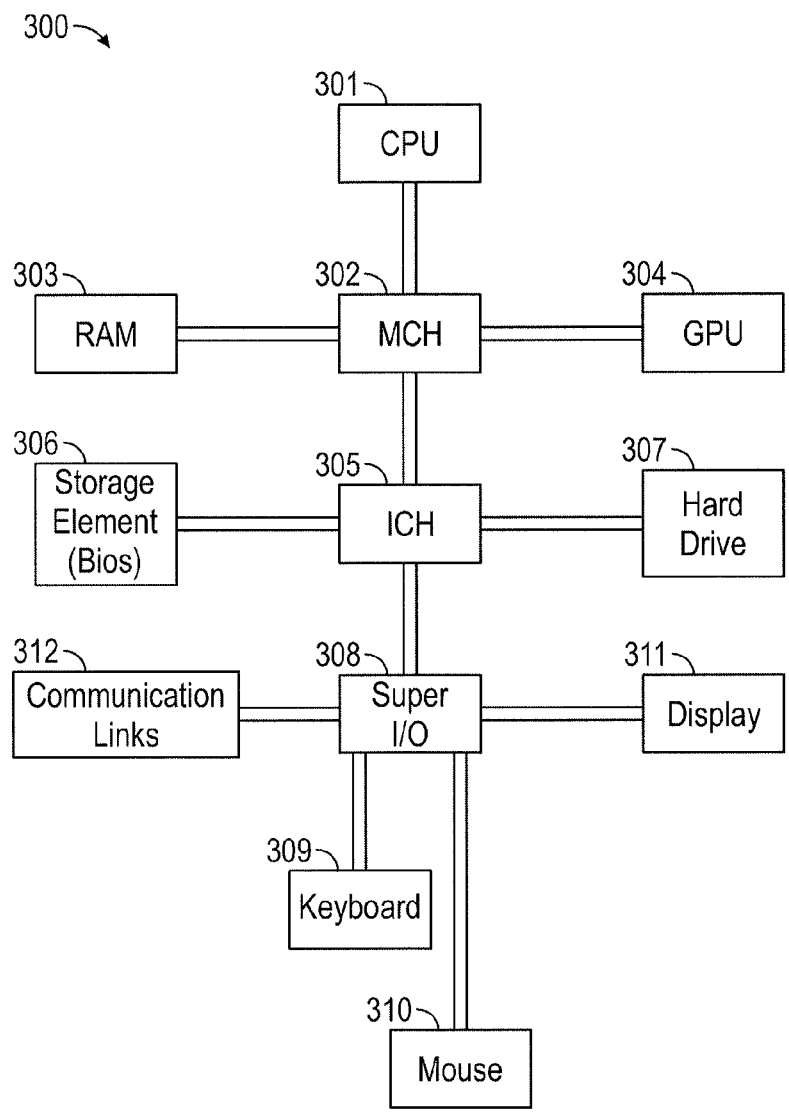
FIG. 3 is a diagram illustrating an information handling system, according to one or more aspects of the present disclosure.

FIG. 3 is a diagram illustrating an example information handling system 300, according to one or more aspects of the present disclosure. The wellbore monitoring system 210 in FIG. 2 may take a form similar to the information handling system 300 or include one or more components of information handling system 300. A processor or central processing unit (CPU) 301 of the information handling system 300 is communicatively coupled to a memory controller hub (MCH) or north bridge 302. The processor 301 may include, for example a microprocessor, microcontroller, digital signal processor (DSP), application specific integrated circuit (ASIC), or any other digital or analog circuitry configured to interpret and/or execute program instructions and/or process data. Processor 301 may be configured to interpret and/or execute program instructions or other data retrieved and stored in any memory such as memory 303 or hard drive 307. Program instructions or other data may constitute portions of a software or application for carrying out one or more methods described herein. Memory 303 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 303, for example, a non-transitory memory, for execution by processor 301.

Modifications, additions, or omissions may be made to FIG. 3 without departing from the scope of the present disclosure. For example, FIG. 3 shows a particular configuration of components of information handling system 300. However, any suitable configurations of components may be used. For example, components of information handling system 300 may be implemented either as physical or logical components. Furthermore, in one or more embodiments, functionality associated with components of information handling system 300 may be implemented in special purpose circuits or components. In other embodiments, functionality associated with components of information handling system 300 may be implemented in configurable general purpose circuit or components. For example, components of information handling system 300 may be implemented by configured computer program instructions.

Memory controller hub 302 may include a memory controller for directing information to or from various system memory components within the information handling system 300, such as memory 303, storage element 306, and hard drive 307. The Memory controller hub 302 may be coupled to memory 303 and a graphics processing unit (GPU) 304. Memory controller hub 302 may also be coupled to an I/O controller huh (ICH) or south bridge 305. I/O controller hub 305 is coupled to storage elements of the information handling system 300, including a storage element 306, which may comprise a flash ROM that includes a basic input/output system (BIOS) of the computer system. I/O controller hub 305 is also coupled to the hard drive 307 of the information handling system 300. I/O controller hub 305 may also be coupled to a Super I/O chip 308, which is itself coupled to several of the I/O ports of the computer system, including keyboard 309 and mouse 310, display 311.

In one or more embodiments, Super I/O chip 308 may be coupled to one or more communication links 312, which may comprise any type of communication channel, connector, data communication network, serial link, a wireless link (for example, infrared, radio frequency, or others), a parallel link, other types of links, and any combination thereof. For example, the communication link 312 may comprise a wireless or a wired network, a Local Area Network (LAN), a Wide Area Network (WAN), a private network, a public network (such as the Internet), a Wi-Fi network, a network that includes a satellite link, or another type of data communication network. The communication link 312 may communicate with the one or more communication links 242.

In one or more embodiments, the wellbore monitoring system 210 may comprise an information handling system 300 with at least a processor and a memory device coupled to the processor that contains one or more instructions that when executed cause the processor to perform one or more actions. In any embodiment, the information handling system may include a non-transitory computer readable medium that stores one or more instructions where the one or more instructions when executed cause the processor to perform one or more actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price.

The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 4:
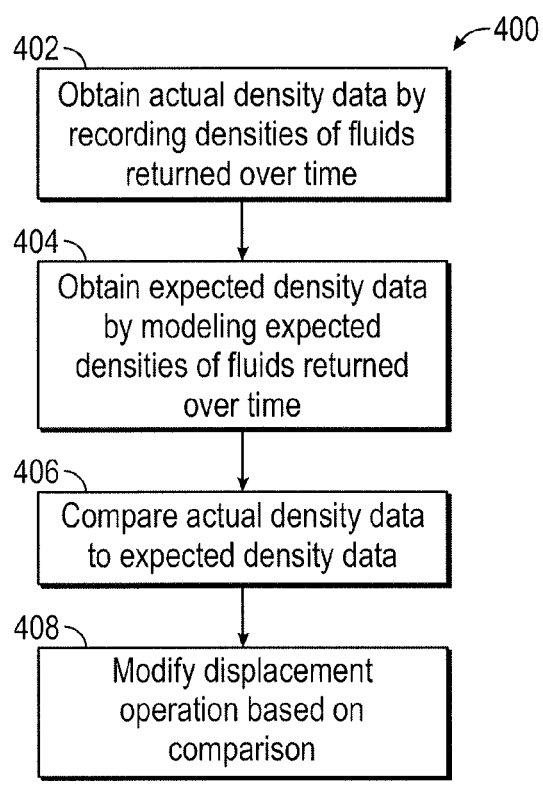
FIG. 4 is a flow chart for modifying a displacement operation, according to one or more aspects of the present invention.

FIG. 4 is an example flow chart 400 used to determine a quantity of solids removed from a wellbore during a displacement operation and modify the displacement operation based on the quantity of solids removed. In one or more embodiments, an information handling system 300, for example, wellbore monitoring system 210 shown in FIG. 2, may implement any one or more steps of process 400. The process 400, one or more individual operations of the process 400, or groups of operations may be iterated or performed in parallel, in series, or in another manner. In one or more embodiments, the process 400 may comprise the same, additional, fewer, or different operations performed in the same or a different order.

In one or more embodiments, process 400 tracks an actual density of return fluid 266 and an expected density of the return fluid 266 at a return line 264. The data for expected density of return fluid 266 at the return line 264 is thereafter compared to the actual density of return fluid 266 at the return line 264 in order to indicate the efficiency of solids removal, and the comparison is used to adjust or modify a displacement operation. The calculations used in process 400 may comprise any one or more of one or more governing equations, one or more empirical models, one or more associated variables, and any combination thereof.

At step 402, actual density data is obtained for one or more return fluids 266 at a return line 264 during the displacement operation. For instance, an actual density may be determined by collecting a return sample at the return line 264 and performing an analysis on the one or more return fluids 266, The return sample may be collected by one or more sampling systems (for example, sampling system 246 in FIG. 2) in the wellbore 218. A plurality of actual density data may then be obtained by collecting a plurality of return samples associated with one or more pump strokes of pump 222 and one or more intervals of time in the displacement operation. An analysis is performed on each of the plurality of return samples to obtain one or more properties of the return fluid 266 for each of the plurality of return samples. For instance, the one or more properties may comprise a density, a viscosity, a water content, an oil content, a solids content, a salt content, a capacitance, a thermal conductivity, an electrical conductivity, ES, pH, other properties, and any combination thereof. Such an analysis of return samples is often known as a "flow back analysis," as is familiar to those skilled in the art. The actual density data may be recorded at one or more predetermined intervals, correlated with one or more pump strokes, plotted against the volume of wellbore servicing fluids 224 pumped in a displacement operation, and any combination thereof. In one or more embodiments, the information handling system may implement step 402 by receiving and recording actual density data based on one or more return samples of the return fluid 266 at the return line 264.

At step 404, expected density data is obtained for one or more return fluids 266 at a return line 264 during the displacement operation. The expected density data is determined analytically using known parameters of one or more fluids in the wellbore 218. For instance, in one or more embodiments, the expected density data is determined using one or more models that use as inputs one or more known parameters of wellbore servicing fluids 224, one or more known parameters of existing fluids 250, one or more known parameters of any other fluid in wellbore 218, and any combination thereof. For instance, the one or more known parameters may comprise a density, a percentage of solids, a viscosity, a pH, one or more other properties, and any combination thereof. For example, the step 404 may use the example one or more one-dimensional models for fluid mixing described with respect to FIGS. 4-6 to determine an expected density of a return sample, or the step 404 may use any other one or more flow models. The flow models may include one or more governing equations and one or more associated variables. A plurality of expected density data for return fluids 266, associated with one or more pump strokes of pump 222 and one or more intervals of time in the displacement operation, may then be modeled. The expected density data may be recorded at one or more predetermined intervals of time, correlated with one or more pump strokes, plotted against a measure of time, and a combination thereof. In one or more embodiments, step 404 may be implemented by the information handling system 300. For example, information handling system 300 may receive data associated with a first fluid 110 and a second fluid 120 in a fluid flow path 219 of wellbore 218. Information handling system 300 may further determine the expected density, for example, using one or more first properties of the first fluid and one or more second properties of the second fluid.

At step 406, a comparison is performed between the actual density data and the expected density data. In one or more embodiments, an expected mass of the return fluids 266 circulated back to return line 264 is obtained by integrating over a curve for expected density plotted against a volume of total circulated fluid. The volume of total circulated fluid may be obtained by summing a plurality of individual volumes associated with each wellbore servicing fluid 224 circulated in a displacement operation (for example, by summing the volume of the first fluid 110 and the volume of the second fluid 120 circulated in a single-stage displacement operation). In one or more embodiments, the volume is determined from the pump rate of pump 222 in wellbore servicing system 200. Likewise, an actual mass of the return fluids 266 circulated back to return line 264 is obtained by integrating over a curve for actual density plotted against the volume of total circulated fluid.

The comparison between the actual mass and expected mass from step 406 may be used to characterize the efficiency of solids removed during the displacement operation. Since the expected mass is derived analytically from known parameters of one or more fluids in the wellbore 218, the expected mass does not account for additional mass introduced to the fluids as the fluids flow through the wellbore (for instance, additional mass from residual substances 248). Therefore, under Lavoisier's principle of mass conservation, the actual mass should not exceed the expected mass by a significant amount unless residual substances 248 are present in the return fluids 266 at return line 264. For instance, if the actual mass vastly exceeds the expected mass, then the comparison may indicate that additional solids remain in the wellbore that require removal. One or more thermal effects for the wellbore servicing fluids 224, one or more thermal effects for the existing fluids 250, and one or more margins of error may be considered to avoid interferences with the comparison.

At step 408, a displacement operation is modified based on the comparison from step 406. The modification of the displacement operation may be performed through automated means, such as the wellbore fluid control subsystem 231 in FIG. 2, for example. For instance, if the comparison indicates that additional solids remain in the wellbore that require removal, the displacement operation may be modified to pump an additional High Viscosity ("Hi Vis") Pill, an additional Push Pill, any other wellbore servicing fluids 224 designed to maximize solids transport effectiveness, and any combination of thereof.

Figure 5:
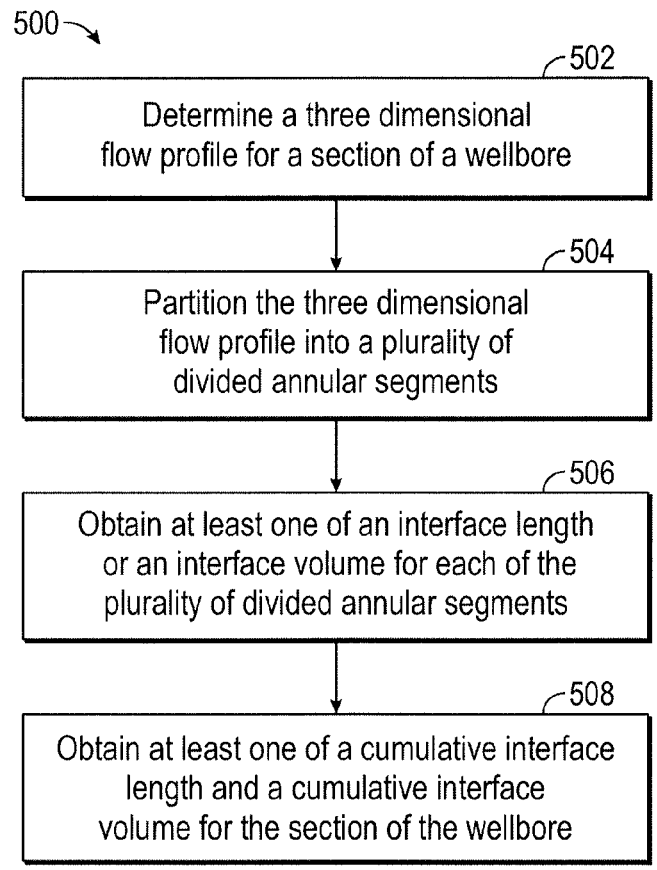
FIG. 5 is a flow chart for determining at least one of an interface length of a mixing and channeling zone and an interface volume of a composite fluid for a section of a wellbore, according to one or more aspects of the present invention.

In one or more embodiments, the expected density in step 404 may be determined, at least in part, by generating a model that predicts mixing and channeling between wellbore servicing fluids 224 and existing fluids 250. FIG. 5 is a flowchart that illustrates a process 500 used to determine at least one of an interface length 160 and an interface volume in a displacement operation, according to one or more aspects of the present disclosure. In one or more embodiments, the first fluid 110 comprises wellbore servicing fluid 224 and the second fluid 120 comprises existing fluid 250 in the fluid flow path 219. In one or more embodiments, an information handling system 300, for example, wellbore monitoring system 210 shown in FIG. 2, may implement any one or more steps of process 500. The process 500, one or more individual operations of the process 500, or groups of operations may be iterated or performed in parallel, in series, or in another manner. In one or more embodiments, the process 500 may comprise the same, additional, fewer, or different operations performed in the same or a different order.

At step 502, a three dimensional flow profile is determined for one or more well system fluids flowing through a fluid flow path 219 (for example, a section of a wellbore 218). For example, the well system fluids may comprise one or more of first fluid 110 in a displacement operation, second fluid 120 in a displacement operation, composite fluid 150, wellbore servicing fluid 124, existing fluid 250, other fluids flowing through any fluid flow path 219 in the wellbore, and any combination thereof. The three dimensional flow profile may comprise, among other things, a velocity profile, a thermal profile, a pressure profile, a shear stress profile, profiles for other fluid properties, and any combination thereof. Methods of obtaining the three dimensional flow profile are known to those of ordinary skill in the art and may comprise methods for both Newtonian and non-Newtonian flow. In one or more embodiments, the three dimensional profile may be determined using governing flow equations, such as, for example, the Navier-Stokes equation, one or more related approximations of the Navier-Stokes equation, one or more diffusion-convection equations, one or more conservation equations, one or more continuity equations, any other one or more equations and any combination thereof. The three dimensional flow profile may also be determined using analytical models for non-Newtonian flow, such as the Herschel-Bulkley model, Power Law model, Bingham Plastic model, any one or more other analytical models, and any combination thereof. In one or more embodiments, the three dimensional profile may also be determined applying numerical methods, for instance, by solving the Navier-Stokes equations with shear-rate dependent viscosity for non-Newtonian flow.

Figure 6:
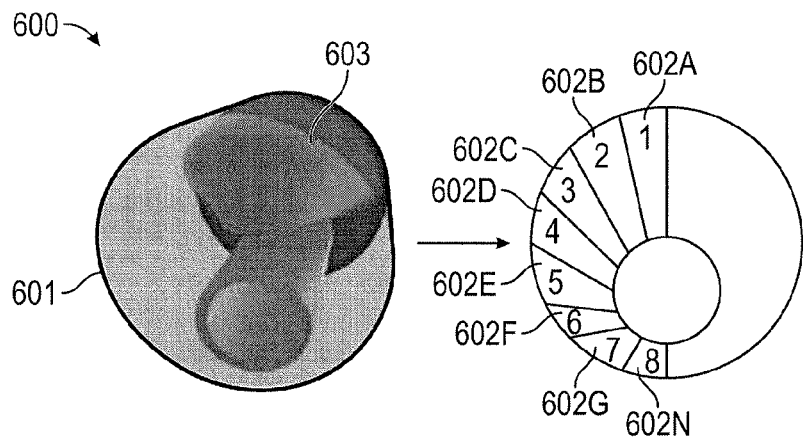
FIG. 6 is a diagram illustrating partitioning an annular wellbore into divided annular segments, according to one or more aspects of the present disclosure.

At step 504, to account for any eccentricity of the wellbore 218, the three dimensional flow profile from step 502 may be partitioned into a plurality of divided annular segments. FIG. 6 illustrates a three dimensional flow profile 603 of a wellbore section 601 that is partitioned by dividing the cross section of the wellbore section 601, according to one or more embodiments of the present disclosure. Applying step 504 results in divided annular segments 602A-602N (collectively, divided annular segments 602), where "N" is any number of divided annular segments 602. One or more analytical methods for pipeline flow may be used for each of the divided annular segments 702 by approximating each divided annular segment 702A-702N as a pipe with a hydraulic diameter. For example, a velocity for each divided annular segment 702A-702N may be determined by determining an average velocity of a respective segment of the three dimensional flow profile 703. In one or more embodiments, each cross sectional area associated with each of the plurality of divided annular segments 602A-602N is substantially equal.

At step 506, at least one of an interface length 160 and an interface volume is obtained for each of the plurality of divided annular segments 602. For instance, the interface length 160 may be obtained using one or more empirical models, such as the Austin Palfrey (1964) empirical model for pipeline flow mixing. One or more first initial parameters of the first fluid 110 and one or more second initial parameters of the second fluid 120, before the displacement operation is performed, may be used as one or more first inputs and one or more second inputs, respectively, in the one or more empirical models.

The empirical model may comprise one or more of example Equations (1)-(6). Example Equations (1)-(6) are applied to each divided annular segment 602A-602N to calculate an interface length 160 for each divided annular segment 602A-602N. Equations (1)-(2) may be used to describe an interface length for the laminar and turbulent regimes of flow. Equation (3) is used to calculate the critical Reynolds number to determine whether the flow is in the laminar or turbulent regime.

$$S_{laminar} = 18420 \times \sqrt{dL} \times Re_m^{-0.09} e^{1.21\sqrt{d}} \qquad \text{(Equation 1)}$$

$$S_{turbulent} = 18420 \times \sqrt{dL} \times Re_m^{-0.09} e^{1.21\sqrt{d}} \qquad \text{(Equation 2)}$$

$$Re_{crit} = 10000 e^{1.52\sqrt{d}} \qquad \text{(Equation 3)}$$

In equations (1)-(3), d is an effective diameter of a divided annular segment 602N and L is a length of a divided annular segment 602N. Reynolds number $Re_m$ is calculated for the composite fluid 150, for example, using the equation:

$$Re_{composite} = \frac{d \times U}{v_{composite}} \qquad \text{(Equation 4)}$$

where U is the average flow velocity in a divided annular segment 602N and $v_{composite}$ is the kinematic viscosity of the composite fluid using a 50%/50% composition of first fluid 110 and second fluid 120, obtained through Gambill's equation (1959):

$$v_m^{1/3} = x_1 v_1^{1/3} + x_2 v_2^{1/3} \qquad \text{(Equation 5)}$$

In Equation (5), $x_1$ and $x_2$ are the mass fraction and $v_1$ and $v_2$ are the kinematic viscosity for the first fluid 110 and second fluid 120, respectively. The kinematic viscosities associated with the first fluid 110 and the second fluid 120 are calculated using one or more densities and one or more apparent viscosities of first fluid 110 and one or more apparent viscosities of the second fluid 120, respectively, estimated at one or more downhole pressures, one or more downhole temperatures, and one or more shear rates.

Figure 7:
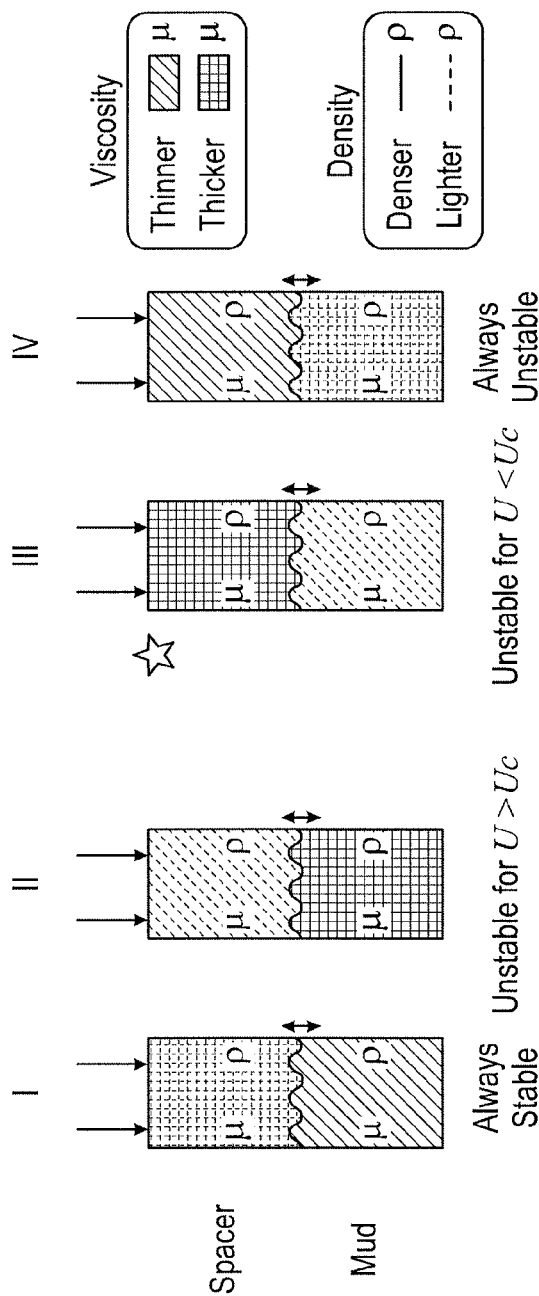
FIG. 7 is a diagram showing interface stability rules used to account for channeling effects in a pipeline.

One or more pipe rotation effects may be considered when estimating an experienced shear rate in the annulus 228, as well as a distance traveled by each of the first fluid 110 and the second fluid 120 and the velocity of each of the first fluid 110 and the second fluid 120 within a given divided annular segment 602. One or more channeling effects may be incorporated in Equation (4) by modifying the fluid velocity term, U, according to one or more interface stability rules in FIG. 7 and the Taylor-Rayleigh equation, described below:

$$U_c = \sqrt{A \times g \times \cos(\text{inclination}) \times \text{Interfacial area}} \quad \text{(Equation 6)}$$

In Equation (6), g is a gravitational constant and A is a modified Attwood number. In one or more embodiments where the interface of first fluid 110 and second fluid 120 is deemed to be unstable according to the interface stability rules, the flow velocity, U, of Equation (4) is modified to consider the channeling velocity, $U_c$.

At step 508, at least one of a cumulative interface length and a cumulative interface volume for the wellbore section 601 may be determined. The cumulative interface length is determined by averaging the one or more interface lengths 160 for each of the plurality of divided annular segments 602 from step 506 for a cumulative mixing and channeling zone. The cumulative interface volume is determined by combining the one or more interface volumes for each of the plurality of divided annular segments 602. In one or more embodiments, the cumulative interface length may be obtained by determining a measure of central tendency for the individual lengths of mixing and channeling, such as an arithmetic mean, weighted mean, or any other measure of central tendency. For instance, the cumulative interface length calculated by an arithmetic mean is given by:

$$S_{cumulative} = \frac{\sum_i^N S_i}{N} \quad \text{(Equation 7)}$$

where $S_{cumulative}$ is the cumulative interface length for the wellbore section 601, $S_i$ is the interface length for each of the plurality of divided annular segments 602 calculated at step 506, and N is the number of divided annular segments 602.

Figure 8:
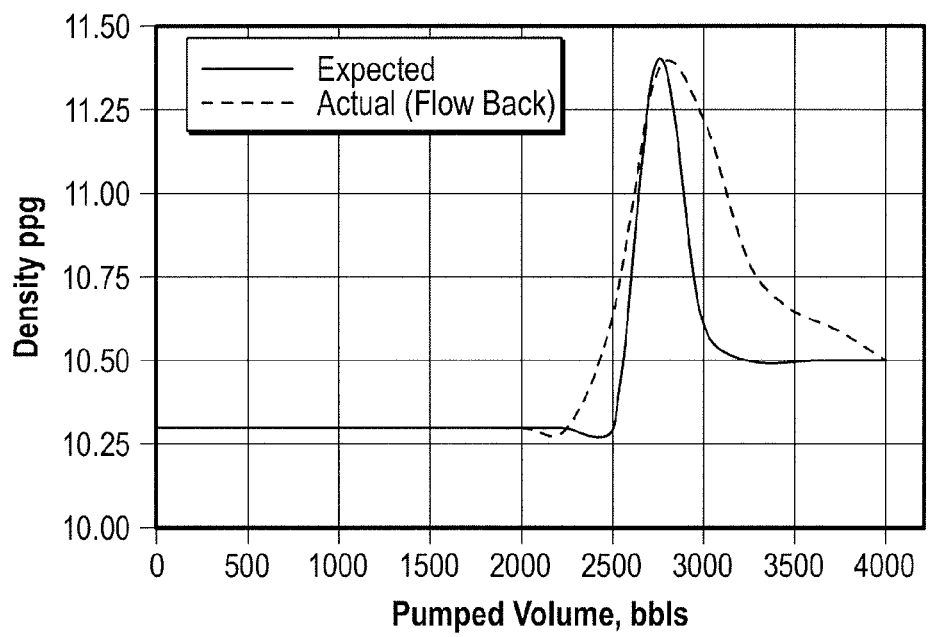
FIG. 8 is a diagram illustrating the results for actual density data and expected density data associated with a displacement operation, according to one or more aspects of the present disclosure.

FIG. 8 is a graph illustrating the computed composition of fluids at a depth in the wellbore at a plurality of intervals of time during a displacement operation, according to one or more aspects of the present disclosure. In one or more embodiments, process 400 is used to provide expected density plotted against volume pumped and actual density plotted against volume pumped. The volume pumped is the volume of wellbore servicing fluids 224 circulated in a displacement operation. The displacement train in FIG. 8 circulated a plurality of wellbore servicing fluids 224 in the following sequence: Oil-Based Mud ("OBM"), Push Pill, Wash Pill, High Viscosity ("Hi Vis") Pill, and Brine. FIG. 8 overlays actual density data from a flowback analysis of the displacement operation, as described by step 402, with expected density data from step 404.

Figure 9:
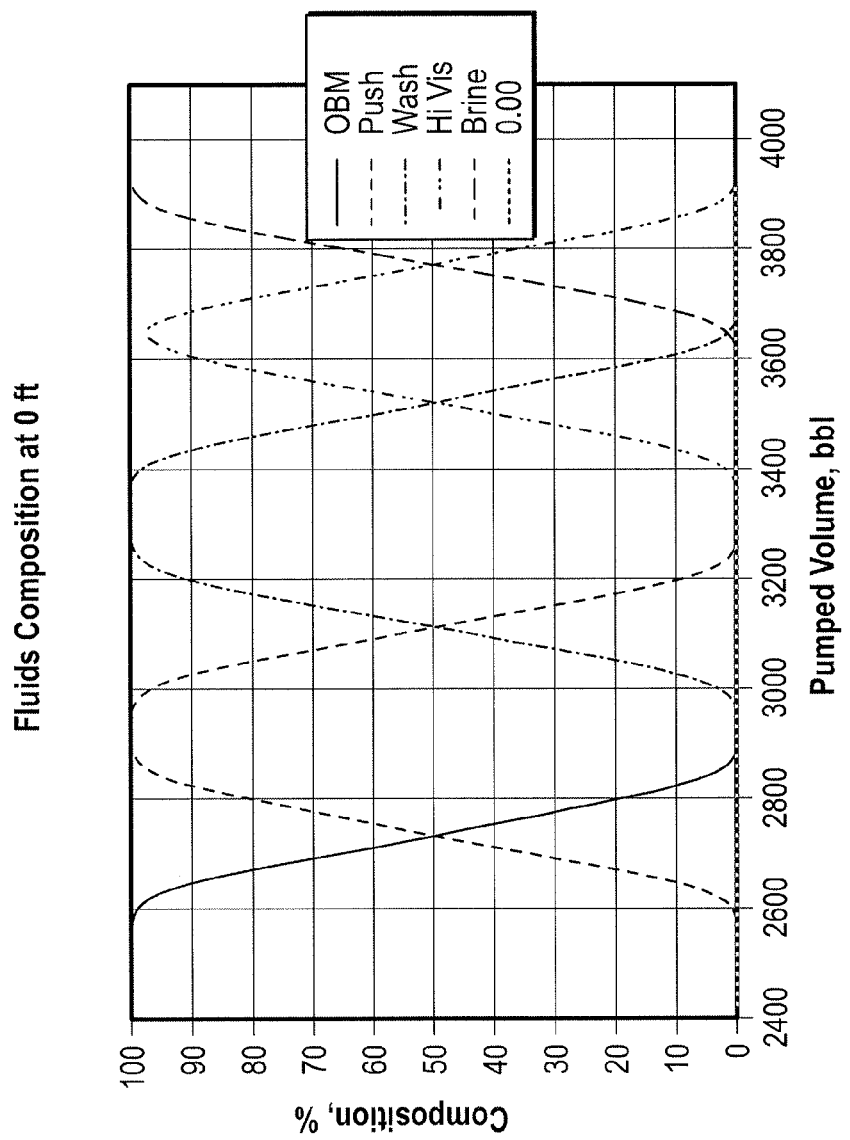
FIG. 9 is a graph illustrating the computed composition of fluids at a depth in the wellbore at a plurality of intervals of time during a displacement operation, according to one or more aspects of the present disclosure.

To obtain the expected density data in step 404, process 500 was used to model the expected composition of return fluids 266 at a plurality of intervals of time during the displacement operation. Since a unique interface exists between any two wellbore servicing fluids 224 in the sequence, process 500 is used for each pair of fluids to determine the composition of return fluid 266 over the course of the displacement operation. Specifically, referring to FIG. 9, four cumulative interface lengths using process 500 were calculated for the following four interfaces: (1) Push Pill displacing OBM, (2) Wash Pill displacing Push Pill, (3) Hi Vis Pill displacing Wash Pill, and (4) Brine displacing Hi Vis Pill. The calculated cumulative interface lengths were used to simulate the locations of composite fluids formed by each one of the five interfaces at a plurality of intervals of time in the simulated displacement operation. For example, the cumulative interface lengths are used to determine that Push Pill, Wash Pill, and the respective interfaces coexist at the return line 264 after 3115 barrels (bbls) (approximately 495.2 kiloliters) of wellbore servicing fluids 224 have been circulated in the displacement operation. The densities of return fluids 266 at the plurality of intervals of time were then obtained from the results displayed in FIG. 9, based on known densities of the wellbore servicing fluids in the displacement train.

The comparison step of 406 revealed that a significant amount of mass was introduced to the return fluid 266 from the wellbore between 2,850 barrels (approximately 453.1 kiloliters) pumped and 4,000 barrels (approximately 635.9 kiloliters) pumped. The additional mass suggested that solids remained in the wellbore that required removal. Accordingly, an appropriate modification of the displacement operation was to pump additional Hi Vis. The required additional volume of Hi Vis may be determined by iterating process 400 until the expected density from step 404 sufficiently matches the actual density from step 402.

In one or more embodiments, a method for performing a displacement operation comprises circulating a first fluid and a second fluid in a fluid flow path of a wellbore as a total circulated fluid, receiving actual density data based on one or more return samples of the return fluid at a return location of the wellbore, determining expected density data for the return fluid based, at least in part, on one or more first properties of the first fluid and one or more second properties of the second fluid, determining an actual mass of fluids circulated based on the actual density data and a volume of the total circulated fluid, determining an expected mass of the total circulated fluids based on the expected density data and the volume of total circulated fluids, comparing the actual mass to the expected mass, and modifying a displacement operation based, at least in part, on the comparison. In one or more embodiments, modifying the displacement operation is in real time. In one or more embodiments, the method further comprises displaying in real time at least one of the actual mass, the expected mass, and the comparison between the actual mass and the expected mass. In one or more embodiments, determining the expected density data comprises determining at least one of a cumulative interface length of a cumulative mixing and channeling zone and a cumulative interface volume of a composite fluid. In one or more embodiments, determining the at least one of the cumulative interface length and the cumulative interface volume comprises determining one or more three dimensional flow profiles for the fluid flow path, dividing the one or more three dimensional flow profiles into a plurality of divided annular segments, and for each of the plurality of divided annular segments, determining at least one of an interface length and an interface volume between the first fluid and the second fluid. In one or more embodiments, each cross sectional area associated with each of the plurality of divided annular segments is substantially equal. In one or more embodiments, determining the at least one of the interface length and the interface volume for each of plurality of divided annular segments comprises determining a Reynolds Number for a mixture comprising the first fluid and the second fluid. In one or more embodiments, determining the interface length comprises determining a modified channeling velocity for each of the plurality of divided annular segments, based on a geometry of the fluid flow path and an interfacial area, wherein the interfacial area is an area of contact between the one or more three dimensional flow profiles and the wellbore.

In one or more embodiments, a non-transitory computer-readable medium stores one or more instructions that, when executed by a processor, cause the processor to receive data associated with a first fluid and a second fluid in a fluid flow path of a wellbore, wherein the first fluid and the second fluid are circulated in the wellbore as a total circulated fluid, receive actual density data based on one or more return samples of a return fluid at a return location of the wellbore, wherein the return fluid comprises at least a portion of at least one of the first fluid and the second fluid, determine expected density data for the return fluid based, at least in part, on one or more first properties of the first fluid and one or more second properties of the second fluid, determine an actual mass of fluids circulated based on the actual density data and a volume of the total circulated fluid, determine an expected mass of the total circulated fluids based on the expected density data and the volume of total circulated fluids, compare the actual mass to the expected mass, and modify a displacement operation based, at least in part, on the comparison. In one or more embodiments, the one or more instructions when executed by the processor further cause the processor to display in real time at least one of the actual mass, the expected mass, and the comparison between the actual mass and the expected mass. In one or more embodiments, determining the expected density data comprises determining at least one of a cumulative interface length of a cumulative mixing and channeling zone and a cumulative interface volume of a composite fluid. In one or more embodiments, determining the at least one of the cumulative interface length and the cumulative interface volume comprises determining one or more three dimensional flow profiles for the fluid flow path, dividing the one or more three dimensional flow profiles into a plurality of divided annular segments, and for each of the plurality of divided annular segments, determining at least one of an interface length and an interface volume between the first fluid and the second fluid. In one or more embodiments, determining the at least one of the interface length and the interface volume for each of plurality of divided annular segments comprises determining a Reynolds Number for a mixture comprising the first fluid and the second fluid. In one or more embodiments, determining the interface length comprises determining a modified channeling velocity for each of the plurality of divided annular segments, based on a geometry of the fluid flow path and an interfacial area, wherein the interfacial area is an area of contact between the one or more three dimensional flow profiles and the wellbore.

In one or more embodiments, an information handling system comprises a memory and a processor coupled to the memory, wherein the memory comprises one or more instructions executable by the processor to receive data associated with a first fluid and a second fluid in a fluid flow path of a wellbore, wherein the first fluid and the second fluid are circulated in the wellbore as a total circulated fluid, receive actual density data based on one or more return samples of a return fluid at a return location of the wellbore, wherein the return fluid comprises at least a portion of at least one of the first fluid and the second fluid, determine expected density data for the return fluid based, at least in part, on one or more first properties of the first fluid and one or more second properties of the second fluid, determine an actual mass of fluids circulated based on the actual density data and a volume of the total circulated fluid, determine an expected mass of the total circulated fluids based on the expected density data and the volume of total circulated fluids, compare the actual mass to the expected mass, and modify a displacement operation based, at least in part, on the comparison. In one or more embodiments, the one or more instructions further executable by the processor to display in real time at least one of the actual mass, the expected mass, and the comparison between the actual mass and the expected mass. In one or more embodiments, determining the expected density data comprises determining at least one of a cumulative interface length of a cumulative mixing and channeling zone and a cumulative interface volume of a composite fluid. In one or more embodiments, determining the at least one of the cumulative interface length and the cumulative interface volume comprises determining one or more three dimensional flow profiles for the fluid flow path, dividing the one or more three dimensional flow profiles into a plurality of divided annular segments, and for each of the plurality of divided annular segments, determining at least one of an interface length and an interface volume between the first fluid and the second fluid. In one or more embodiments, determining the at least one of the interface length and the interface volume for each of plurality of divided annular segments comprises determining a Reynolds Number for a mixture comprising the first fluid and the second fluid. In one or more embodiments, determining the interface length comprises determining a modified channeling velocity for each of the plurality of divided annular segments, based on a geometry of the fluid flow path and an interfacial area, wherein the interfacial area is an area of contact between the one or more three dimensional flow profiles and the wellbore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

A number of examples have been described. Nevertheless, it will be understood that various modifications may be made. Accordingly, other embodiments are within the scope of the following claims.

What is claimed is:

1. A method for performing a displacement operation comprising:
   circulating a first fluid and a second fluid in a fluid flow path of a wellbore as a total circulated fluid;
   receiving actual density data based on one or more return samples of a return fluid at a surface of the wellbore, wherein the return fluid comprises at least a portion of at least one of the first fluid and the second fluid;
   determining expected density data for the return fluid based, at least in part, on one or more first properties of the first fluid and one or more second properties of the second fluid;
   determining an actual mass of fluids circulated based on the actual density data and a volume of the total circulated fluid;
   determining an expected mass of the total circulated fluids based on the expected density data and the volume of total circulated fluids;
   comparing the actual mass to the expected mass; and
   modifying a displacement operation in real time based, at least in part, on the comparison.

2. The method of claim 1, comprising displaying in real time at least one of the actual mass, the expected mass, and the comparison between the actual mass and the expected mass.

3. The method of claim 1, wherein determining the expected density data comprises determining at least one of a cumulative interface length of a cumulative mixing and channeling zone and a cumulative interface volume of a composite fluid.

4. The method of claim 3, wherein determining the at least one of the cumulative interface length and the cumulative interface volume comprises:
   determining one or more three dimensional flow profiles for the fluid flow path;
   dividing the one or more three dimensional flow profiles into a plurality of divided annular segments; and
   for each of the plurality of divided annular segments, determining at least one of an interface length and an interface volume between the first fluid and the second fluid.

5. The method of claim 4, wherein each cross sectional area associated with each of the plurality of divided annular segments is substantially equal.

6. The method of claim 4, wherein determining the at least one of the interface length and the interface volume for each of plurality of divided annular segments comprises determining a Reynolds Number for a mixture comprising the first fluid and the second fluid.

7. The method of claim 4, wherein determining the interface length comprises determining a modified channeling velocity for each of the plurality of divided annular segments based on a geometry of the fluid flow path and an interfacial area, wherein the interfacial area is an area of contact between the one or more three dimensional flow profiles and the wellbore.

8. A non-transitory computer-readable medium storing one or more instructions that, when executed by a processor, cause the processor to:
   receive data associated with a first fluid and a second fluid in a fluid flow path of a wellbore, wherein the first fluid and the second fluid are circulated in the wellbore as a total circulated fluid;
   receive actual density data based on one or more return samples of a return fluid at a surface of the wellbore, wherein the return fluid comprises at least a portion of at least one of the first fluid and the second fluid;
   determine expected density data for the return fluid based, at least in part, on one or more first properties of the first fluid and one or more second properties of the second fluid;
   determine an actual mass of fluids circulated based on the actual density data and a volume of the total circulated fluid;
   determine an expected mass of the total circulated fluids based on the expected density data and the volume of total circulated fluids;
   compare the actual mass to the expected mass; and
   modify a displacement operation in real time, based, at least in part, on the comparison.

9. The non-transitory computer-readable medium of claim 8, wherein the one or more instructions when executed by the processor further cause the processor to display in real time at least one of the actual mass, the expected mass, and the comparison between the actual mass and the expected mass.

10. The non-transitory computer-readable medium of claim 8, wherein determining the expected density data comprises determining at least one of a cumulative interface length of a cumulative mixing and channeling zone and a cumulative interface volume of a composite fluid.

11. The non-transitory computer-readable medium of claim 10, wherein determining the at least one of the cumulative interface length and the cumulative interface volume comprises:
   determining one or more three dimensional flow profiles for the fluid flow path;
   dividing the one or more three dimensional flow profiles into a plurality of divided annular segments; and
   for each of the plurality of divided annular segments, determining at least one of an interface length and an interface volume between the first fluid and the second fluid.

12. The non-transitory computer-readable medium of claim 11, wherein determining the at least one of the interface length and the interface volume for each of the plurality of divided annular segments comprises determining a Reynolds Number for a mixture comprising the first fluid and the second fluid.

13. The non-transitory computer-readable medium of claim 11, wherein determining the interface length comprises determining a modified channeling velocity for each of the plurality of divided annular segments, based on a geometry of the fluid flow path and an interfacial area, wherein the interfacial area is an area of contact between the one or more three dimensional flow profiles and the wellbore.

14. An information handling system comprising:
   a memory;
   a processor coupled to the memory, wherein the memory comprises one or more instructions executable by the processor to:
      receive data associated with a first fluid and a second fluid in a fluid flow path, wherein the first fluid and the second fluid are circulated in a wellbore as a total circulated fluid;
      receive actual density data based on one or more return samples of a return fluid at a surface of the wellbore, wherein the return fluid; comprises at least a portion of at least one of the first fluid and the second fluid;
      determine expected density data for the return fluid based, at least in part, on one or more first properties of the first fluid and one or more second properties of the second fluid;
      determine an actual mass of fluids circulated based on the actual density data and a volume of the total circulated fluid;
      determine an expected mass of the total circulated fluids based on the expected density data and the volume of total circulated fluids;
      compare the actual mass to the expected mass; and
      modify a displacement operation in real time based, at least in part, on the comparison.

15. The information handling system of claim 14, wherein the one or more instructions further executable by the processor to display in real time at least one of the actual mass, the expected mass, and the comparison between the actual mass and the expected mass.

16. The information handling system of claim 14, wherein determining the expected density data comprises determining at least one of a cumulative interface length of a cumulative mixing and channeling zone and a cumulative interface volume of a composite fluid.

17. The information handling system of claim 16, wherein determining the at least one of the cumulative interface length and the cumulative interface volume comprises:
- determining one or more three dimensional flow profiles for the fluid flow path;
- dividing the one or more three dimensional flow profiles into a plurality of divided annular segments; and
- for each of the plurality of divided annular segments, determining at least one of an interface length and an interface volume between the first fluid and the second fluid.

18. The information handling system of claim 17, wherein determining the at least one of the interface length and the interface volume for each of the plurality of divided annular segments comprises determining a Reynolds Number for a mixture comprising the first fluid and the second fluid.

19. The information handling system of claim 17, wherein determining the interface length comprises determining a modified channeling velocity for each of the plurality of divided annular segments, based on a geometry of the fluid flow path and an interfacial area, wherein the interfacial area is an area of contact between the one or more three dimensional flow profiles and the wellbore.

* * * * *